Oct. 27, 1964   R. D. ROTHSCHILD   3,154,327
DETACHABLE PIPE COUPLING ASSEMBLY
Filed Dec. 26, 1961   2 Sheets-Sheet 1
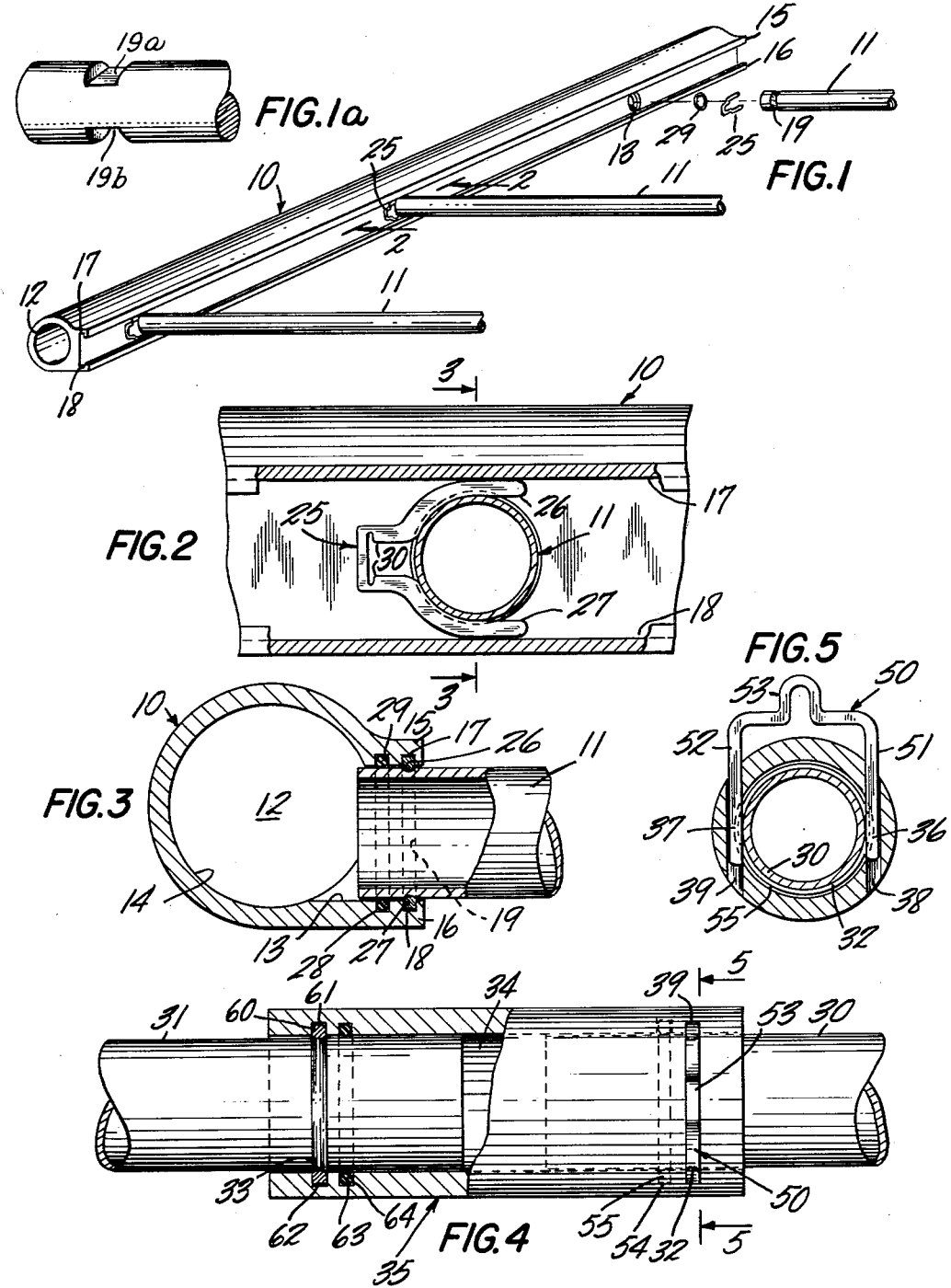

Oct. 27, 1964  R. D. ROTHSCHILD  3,154,327
DETACHABLE PIPE COUPLING ASSEMBLY
Filed Dec. 26, 1961  2 Sheets-Sheet 2

United States Patent Office 3,154,327
Patented Oct. 27, 1964

3,154,327
DETACHABLE PIPE COUPLING ASSEMBLY
Richard D. Rothschild, Rye, N.Y., assignor to Jacobson and Company, Inc., New York, N.Y., a corporation of New York
Filed Dec. 26, 1961, Ser. No. 161,879
6 Claims. (Cl. 285—189)

The present invention relates generally to a detachable locked coupling assembly and more particularly to improvements in the coupling of pipes, tubular members and the like.

Pipes and tubes are most commonly joined together by threading end sections of the pipes and connecting them by screwing the threaded sections together. Quite often, the coupling is facilitated by employing a threaded coupling member, or union, into which the two pipes to be joined are screwed. Where it is necessary to insure a tightly sealed joint, normally spreadable plastic material, commonly known as pipe dope, may be applied to the joint. Various other means have been employed to join pipes or tubes together such as welding, soldering or brazing.

In such prior art coupling methods, the assembly and joining of pipes or tubes require trained workmen to make a proper leakproof joint, the integrity of the joints made being dependent on the skill and the workmanship of the individual making the joint. Moreover, the joints are apt to be of a permanent character and are not quickly or easily detachable. In disconnecting the joined ends, the parts, fittings and the pipes or tubes themselves may be easily damaged and to that extent they must be replaced or repaired. Joints which employ fittings or welding or brazing techniques increase the pipe or tube diameter at the joint, thereby preventing the fitting of another part against the outside surface thereof at the location of the joint. In addition, because of the rigidity and immobility of such joints, they do not provide an integral flexible cushion to absorb vibration, expansion, contraction, nor do they allow rotation or other movement of joined parts without affecting the integrity of the joint.

The present invention is particularly useful in that unskilled personnel may join or disassemble the pipes or tubes repeatedly by simply inserting or removing a locking member, thereby physically securing or disconnecting the joined pipes. The joints may be either of a temporary or permanent nature. Pipes which are assembled or disassembled in this manner may be serviced, repaired or replaced without damage to the members forming the joint. In reassembly, they may also be rotated from their original position without affecting the joint. Moreover, the integrity of the joint is a result of its design and construction and is not dependent on the skill of the individual assembling the parts. In addition, the joint provides a plastic cushion which absorbs vibration, expansion, contraction and allows rotation or other movement of joined parts. Unlike tubular parts joined by conventional methods, the parts forming the joint of the present invention are more readily interchangeable.

Accordingly, the invention comprises an assembly which includes a tubular member adapted to fit into a coupling member. The tubular member may have transverse notches in diametrically located portions of its outer periphery or an external annular groove. Matching the transverse notches or annular groove of the tubular member when the assembly is properly aligned are opposed notches in the inner surface of the coupling member receiving the tubular member. The coupling member is also provided with parallel guide ways which lead to and are substantially aligned with the notches in the inner surface thereof. To lock the tubular member to the coupling member, a retainer clip having a pair of laterally spaced substantially parallel arms is employed which slides into the aligned notches. The cross-sectional depth of each retainer clip arm is preferably greater than the cross-sectional depth of either one of the paired notches and therefore, the arms of the retainer clip, when in locking relation, are disposed partially within each of the paired notches locking the tubular member and the coupling member together. A portion of the retainer clip is always external to the paired aligned notches, thereby permitting the retainer clip to be removable by externally sliding and thereby retracting the retainer clip in the guide ways. A fluid pressure tight joint is insured by providing a gasket disposed in a groove in an opposing surface of one of the opposed portions of the pair of members of the coupling spaced laterally inward or on the inboard side of the coupling connection and the opposed notches of the latter. The gasket has a sealing face in snug contact with the opposed surface of the other member of the coupling and may be seated in an inner annular groove in the coupling member and fit snugly around the outer periphery of the tubular member forming a pressure tight seal between the tubular member and the coupling member.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a perspective view showing a main header pipe having a series of branched pipes coupled at right angles to the main header pipe, one of said branched pipes being shown disassembled;

FIGURE 1a shows a branch pipe having transverse notches therein;

FIGURE 2 is a cross-sectional end view taken along the line 2—2 of FIGURE 1 showing the branched pipe in locked relationship to the main header;

FIGURE 3 is a cross-sectional side view taken along the line 3—3 of FIGURE 2 showing the locked coupling assembly;

FIGURE 4 shows a partial longitudinal cross-section of a pair of pipe members coupled end to end;

FIGURE 5 is a cross-sectional view taken along the line 5—5 of FIGURE 4 showing the disposition of the retainer clip in the locked coupling assembly;

Figure 8:
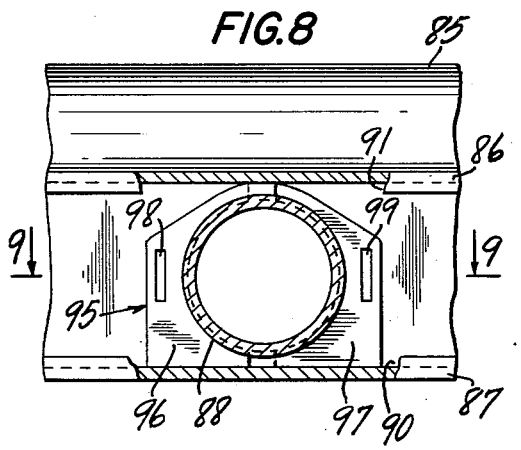
Figure 9:
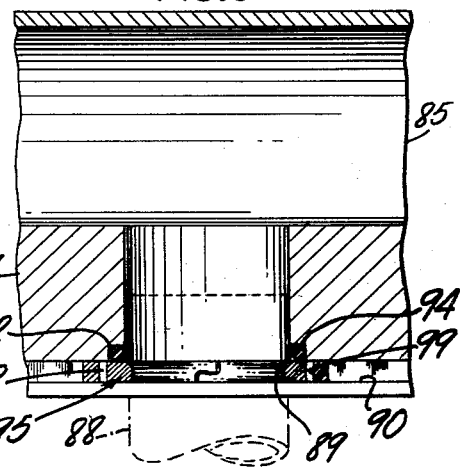
Figure 6:
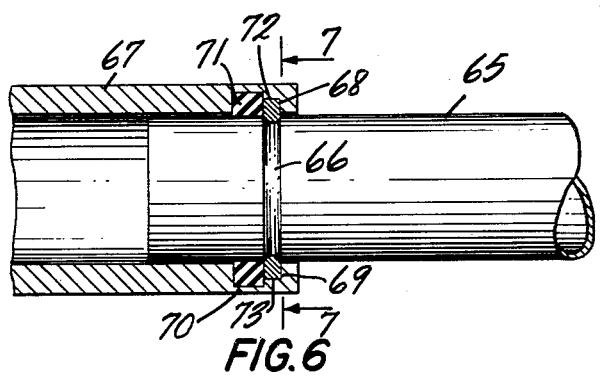
Figure 7:
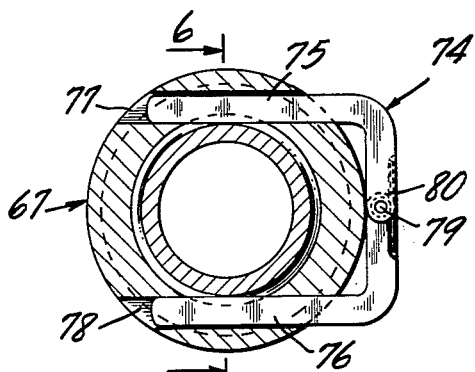

FIGURE 6 in another embodiment of the invention showing a cross-sectional view of a pipe in coupled relationship to a coupling member;

FIGURE 7 is an end view in cross-section taken along the line 7—7 of FIGURE 6;

FIGURE 8 is a view similar to that of FIGURE 2 showing, in cross-section, a different embodiment of the invention wherein a two piece retainer clip is employed to a define a portion of the sides of the notches which receive a gasket; and FIGURE 9 is a cross-sectional view taken along the line 9—9 of FIGURE 8.

Referring to FIGURES 1, 2 and 3, a preferred embodiment of the invention is shown as it is adapted for use with a right angle coupling connection. The header pipe 10 from which the tubular members or branch pipes 11 take off at right angles, may carry a gas or a liquid through its cylindrical longitudinal bore 12. The header pipe 10 has an aperture 13 in its wall 14 communicating with the bore 12, said aperture 13 being adapted to receive the branch pipe 11 when it is inserted therein.

The header pipe 10 is constructed with a pair of longitudinally extending, spaced apart opposed lateral flanges 15 and 16 on opposite sides of the aperture 13. The juxtaposed surfaces of flanges 15 and 16 are provided with substantially aligned and parallel longitudinally extending channels 17 and 18 respectively.

Branch pipe 11, preferably, is provided with an annular groove 19 in its outer periphery near one end of the pipe intended to be coupled to the main header pipe 10. The distance from that end of the branch pipe 11 to the annular groove 19 is such that when the branch pipe 11 is properly inserted between the flanges 15 and 16 into the aperture 13 of the main header 10, the annular groove 19 is in alignment with and diametrically opposite the channels 17 and 18 of flanges 15 and 16 respectively and fluid from bore 12 is capable of flowing through the interior of branch pipe 11.

A generally U-shaped retainer clip 25 having substantially parallel arms 26 and 27, is provided, the arms of the retainer clip being normally compressible toward each other. In the locked coupling assembly, the arm 26 is located partially within channel 17 and the section of the groove 19 aligned therewith. Arm 27 is located partially within channel 18 and the opposite section of groove 19 aligned therewith. The cross-sectional depth of arms 26 and 27 preferably is greater than the cross-sectional depth of either the channel or the groove into which the arms slide. Thus, the arms of the retainer clip are so dimensioned to fit at least partially in the groove and in the channel aligned therewith so that, in the locking position, the arms serve to prevent axial removal of the branch pipe 11.

In each aperture 13 in the main header 10, there preferably is provided an annular groove 28 adapted to receive therein a gasket 29 having an inner diameter fitting snugly around the outer circumference of branch pipe 11, when the latter is disposed in aperture 13.

Disessembly of the locked coupling assembly is a relatively simple matter. The retainer clip 25 is merely released from its locking position by withdrawing and sliding it in a longitudinal direction in channels 17 and 18. When the retainer clip arms 26 and 27 have been totally withdrawn from the sections of the annular groove 19 in which they were disposed, sliding movement of branch pipe 11 in a direction transverse to the main header 10 is possible. Thus, branch pipe 11 may be easily removed from between flanges 15 and 16 by withdrawing it therefrom.

Assembly of the branch pipe 11 in locking relationship with the main header 10 is accomplished by simply inserting the former between flanges 15 and 16 into the aperture 13 provided therefor. When the annular groove 19 is opposed to and aligned with the channels 17 and 18, retainer clip 25 is slidingly guided along channels 17 and 18 until each arm of the retainer clip is inserted in both the channel and the groove. Because each arm of the retainer clip 25 is larger than either the cross-sectional depth of the channel or the groove into which it fits, insertion of the arm results in a positive locking relationship between the main header 10 and the branch pipe 11, preventing any substantial movement of the two pipes with respect to each other. However, even though substantial movement is prevented, this construction permits rotation or slight movement of the pipes resulting from vibration, expansion, contraction or other light motion without affecting the locked relationship of the coupled assembly.

Gasket 29 in groove 28 fits snugly around the circumference of the branch pipe 11 at the entrance to the aperture 13 and acts as a sealing member to prevent the leakage of fluid at the joints of the coupling assembly.

The arms of the retainer clip 25 preferably may be compressible towards each other so that in the locked relationship the arms will be under slight tension directing them outward against the channels 17 and 18. Since the cross-sectional depth of the arms 26 and 27 is greater than the cross-sectional depth of the channels, the arms will, of necessity, fit only partially within the channels 17 and 18, the remaining section of the arms fitting in the annular groove 19. The retainer clip 25 preferably is provided with an externally engageable portion 30 to enable easy removal and insertion of the retainer clip by externally sliding the clip in the channels of the flanges.

It is understood that branch pipe 11 may be provided with diametrically located transverse notches instead of annular groove 19. Such transverse notches 19a and 19b are shown in FIGURE 1a. However, for convenience in assembly of the locked joint, it is preferable to employ an annular groove which extends completely around the circumference of the branch pipe 11, as this construction makes it simpler to align the groove with its opposed notches in the flange.

It is also understood that the tubular member and the matching aperture into which it mates may be of any cross-sectional shape such as circular, elliptical, triangular, rhomboidal, rectangular, square or the like.

Another embodiment of the invention is illustrated in FIGS. 4 and 5 wherein the principles of the invention are employed for coupling a pair of tubular members end to end. Tubular members 30 and 31, to be coupled to each other, are each provided with an annular groove 32 and 33 respectively, located near the end of the member to be coupled. In the locked coupling relationship, each tubular member 30 and 31 is inserted in a cylindrical bore 34 extending longitudinally through the coupling member 35 which is slidably adapted to receive the grooved ends of tubular members 30 and 31.

Near the end of the coupling member 35, adapted to receive tubular member 30, there is located a pair of opposed transverse notches 36 and 37 disposed in the wall surface of the interior cylindrical bore 34. Notches 36 and 37 are aligned with and adjacent to the annular groove 32 in tubular member 30 when that tubular member is properly positioned for locking relationship with the coupling member 35. Communicating and substantially aligned with the transverse notches 36 and 37 are substantially parallel transverse bores 38 and 39 respectively, in the wall of coupling member 35.

In the locked relationship, a retainer clip 50, having a pair of laterally spaced substantially parallel arms 51 and 52 is disposed in the transverse bores 38 and 39 and in the notches 36 and 37 respectively. The arms 51 and 52 of the retainer clip 50 have a cross-sectional depth which is greater than the cross-sectional depth of the notches in which the arms are disposed. Preferably, the cross-sectional depth of the arms 51 and 52 have a cross-sectional depth greater than the groove 32 in the tubular member 30. Therefore, the arms 51 and 52 will be located partially within each of the aligned grooves and notches, thereby locking the tubular member 30 and the coupling member 35 together. The retainer clip 50 is intended for external insertion into the transverse bores 38 and 39 and, therefore, is provided with an externally engageable portion 53 which simplifies the insertion and removal of the retainer clip 50. It is generally desirable to provide the retainer clip in substantially U-shaped form with the opposing arms 51 and 52 under slight tension, thereby causing the arms to be urged away from each other. Upon insertion of the retainer clip 50 into the transverse bores 38 and 39, the arms are compressed slightly. Thus, in the locked position, the arms 51 and 52 press outwardly against the notches 36 and 37. By this means, the locking relationship is maintained positive and the probability of the retainer ring 50 accidentally slipping out of locking relationship is reduced.

To effect a fluid tight seal between the tubular member 30 and the coupling member 35, an annular groove 54 is provided in the inner surface of the coupling member 35 adjacent to, inwardly from and substantially parallel to the transverse notches 36 and 37. Gasket 55, made of a compressible material of the type generally employed for gaskets, is located in the annular groove 54 and designed so that the inner diameter of the gasket 55 fits snugly around the outer circumference of tubular member 30, thereby forming a seal between the outer wall of tubular member 30 and the wall forming the cylindrical bore 34 of coupling member 35. If desired, the gasket may be seated in an annular groove (not shown) in the tubular member and adapted so that the outer diameter of the gasket is pressed against inner wall of the coupling member to effect a fluid tight seal.

In like manner, tubular member 31 may be maintained in locked relationship to coupling member 35 by inserting a retainer clip 60, similar to the retainer clip 50 used to lock tubular member 30 to coupling member 35, in transverse notches 61 and 62 disposed in the interior cylindrical bore surface 34. Gasket 63 is placed in an annular groove 64 in the inner wall of coupling member 35 located adjacent to and inwardly from the transverse notches 61 and 62.

Thus, to obtain a locked coupling relationship between tubular members 30 and 31 it is first preferable to insert gaskets 55 and 63 into their associated grooves 54 and 64 in the coupling member 35. Then tubular members 30 and 31 are each individually inserted into the cylindrical bore 34 of the coupling member 35. As the annular groove 32, 33 on each tubular member 30, 31 is aligned with the transverse notches 36, 37 and 61, 62 in the coupling member 35, a retainer clip 50, 60 is inserted through the transverse bores of the coupling member and into the matching notches and grooves and serves to lock the coupling member and tubular member together. Removal of a tubular member is easily effected by withdrawing the retainer clip from the transverse notches in the coupling member, thereby unlocking that tubular member from the coupling member.

In still another embodiment of the invention, a portion of the retainer clip may be employed as sides of the notches which receive the gasket. Thus, the arms rest partly against the gasket. This structure, shown in FIGS. 6 through 9, has an added advantage in that a portion of the gasket is employed as a means to assist the retention of the retainer clip in place when in locked relationship. This arrangement has the further advantage of ease of insertion and removal of the gasket as well as positive retention of the gasket in the groove when the retaining clips are in locked position. In FIG. 6, a tubular member 65 having an annular groove 66 near one end thereof, is shown inserted in a coupling member 67 having transverse notches 68 and 69 in the interior wall of member 67. Adjacent to the transverse notches 68 and 69, is an annular groove 70 in the interior wall of the coupling member 67. Annular groove 70 has a cross-sectional depth which is greater than the cross-sectional depth of either of the transverse notches 68 and 69. Gasket 71 is retained in annular groove 70 and diametrically opposed portions 72 and 73 thereof form a side wall of the transverse notches 68 and 69. Retainer clip 74 having arms 75 and 76 is disposed in transverse bores 77 and 78 located in the wall of the coupling member 67. Portions of the arms of the retainer clip are in contact with the gasket 71 and assist in retaining the gasket in place when the tubular member 65 is in locked relationship with the coupling member 67. Retainer clip 74 may be comprised of separate arms 75 and 76 which are connected at 79 employing a spring clip 80 adapted normaly to assert an outward spring tension between arms 75 and 76.

Where the tubular member is to be coupled at right angles to the coupling member, a similar arrangement as heretofore described may be adapted to enable the gasket to be employed as portions of the wall defining the clip receptive notches. In FIGS. 8 and 9 are shown the main header or coupling member 85 having flanges 86 and 87. Tubular member 88 is equipped with an annular groove 89 adapted to be aligned with channels 90 and 91 in the flanges 87 and 86. An annular groove 92 is provided in the wall 93 of the coupling member 85 adapted to receive therein gasket 94. Retainer clip 95 consists of two juxtaposed, generally C-shaped sections 96 and 97 which are disposed on opposite sides of the tubular member 88 and which are adapted to fit snugly around said member when sections 96 and 97 are pressed together. Sections 96 and 97 are provided with interfitting lugs at the ends thereof which interlock when coupled together. Each section of retainer clip 95 is capable of sliding in the longitudinal channels 90 and 91 of flanges 87 and 86. When the sections 96 and 97 are coupled together, they fit partially in the channels 90 and 91 and partially in the annular groove 89, thereby locking the tubular member 88 to the coupling member 85. The retainer clip sections 96 and 97 may be provided with external gripping portions 98 and 99 for ease of sliding in the channels. In this way, the retainer clip sections 96 and 97 may form a portion of the sides of the annular groove 92 and the gasket 94 may be conveniently retained in place against the retainer clip 95.

The principles of the invention may be employed for coupling together pipes, tubes or conduits in end to end relationship or at right angles, or cap members may be coupled to pipes, tubes, conduits or containers for closing off the ends thereof.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A detachable locked pipe coupling assembly comprising in combination,
   (a) a first tubular member having an annular groove in its outer peripheral surface near one end thereof,
   (b) a second tubular member having a cylindrical longitudinal bore, the wall of the second tubular member having an aperture therein angularly communicating with the bore and receiving therein the grooved end of the first tubular member,
   (c) said second tubular member being provided along one side thereof with a pair of longitudinally extending spaced apart opposed lateral flanges disposed on opposite sides of the aperture and receiving therein the first tubular member,
   (d) said flanges being provided with substantially aligned and opposed substantially parallel inwardly disposed channels in alignment with adjacent diametrically opposite sections of the annular groove in the first tubular member,
   (e) a generally U-shaped retainer clip having arms so dimensioned to fit at least partially in the groove and in the channel aligned therewith to prevent axial removal of said first tubular member,
   (f) and said retainer clip having an externally engageable portion for slidably removing the arms of the retainer clip from the aligned groove and channel upon retraction in said channels.

2. A detachable locked pipe coupling assembly for locking together pipes angularly related to each other comprising, in combination,
   (a) a first tubular member having a longitudinal bore therein, said tubular member having transverse notches in diametrically located portions of its outer peripheral surface near one end thereof,
   (b) a second tubular member having a longitudinal bore therein, the axis of said second tubular member being disposed angularly to the axis of the first tubular member,
   (c) the second tubular member having an aperture in the wall thereof angularly communicating with its longitudinal bore and receiving therein the notched end of the first tubular member, (d) the second tubular member being provided along one side thereof with a pair of longitudinally extending spaced apart opposed lateral flanges disposed on opposite sides of the aperture, (e) said flanges being provided with substantially aligned and opposed substantially parallel inwardly disposed channels in alignment with adjacent diametrically opposite sections of the notches in the first tubular member, (f) a retainer clip having a pair of laterally spaced arms each of which is so dimensioned to fit at least partially in the channel and adjacent notch paired therewith to prevent axial removal of said first tubular member, (g) said retainer clip having an externally engageable portion for slidably removing said arms from said paired notches and channels upon retraction therefrom.

3. A detachable locked pipe coupling assembly, comprising, in combination,
(a) a plurality of tubular members each having a longitudinal bore therein, each of said tubular members having an annular groove in the outer peripheral surface thereof,
(b) a main header pipe member having a longitudinal bore whose axis is disposed angularly to the axis of each of the bores of the plurality of tubular members,
(c) the main header pipe member having a plurality of apertures in the wall thereof, said apertures each angularly communicating with the bore in the main header pipe member and each adapted to receive therein the grooved end of one of said plurality of tubular members,
(d) the main header pipe member being provided along one side thereof with means having a pair of longitudinally extending spaced apart opposed lateral channels inwardly disposed on opposite sides of said apertures in alignment with adjacent diametrically opposite sections of the annular grooves in the plurality of tubular members,
(e) a plurality of retainer clips each having a pair of laterally spaced arms so dimensioned to fit at least partially in the groove and in the channel paired therewith to prevent axial removal of said first tubular member, and
(f) each of said retainer clips having an externally engageable portion for slidably retracting said arms in the channels whereby a tubular member is detached from the main header pipe member.

4. A readily separable end to side pipe coupling assembly comprising, in combination,
(a) a first tubular member having a longitudinal bore therein, said tubular member having an annular groove in its outer peripheral surface near one end thereof,
(b) a second tubular member having a longitudinal bore therein, the axis of said second tubular member being disposed angularly to the axis of the first tubular member,
(c) the second tubular member having an aperture in the wall thereof angularly communicating with its longitudinal bore and receiving therein the grooved end of the first tubular member, (d) the second tubular member being provided along one side thereof with a pair of longitudinally extending spaced apart opposed lateral flanges disposed on opposite sides of the aperture, (e) said flanges being provided with substantially aligned and opposed substantially parallel inwardly disposed flat bottomed channels in adjacent alignment with diametrically opposite sections of the annular groove in the first tubular member, (f) a retainer clip having a pair of outwardly spring urged laterally spaced arms so dimensioned to be adapted to fit at least partially in the groove and in the channel paired therewith whereby compressing said arms of the retainer clip permits insertion of said retainer clip in a direction generally lateral to the axis of the second tubular member and releasing said arms permits said arms to spring outwardly to engage said channels and to be slid into said groove and channels aligned therewith to prevent axial removal of said first tubular member, and (g) said retainer clip having an externally engageable portion for slidably removing said arms from said paired groove and channel upon retraction therefrom.

5. A detachable locked pipe coupling assembly as defined in claim 1, in which
(a) said second tubular member is provided with an annular groove inwardly disposed in the wall forming the aperture angularly communicating with the bore of said second tubular member and
(b) a gasket annulus disposed in said last mentioned groove and fitting snugly against the opposed complementary surface of the first tubular member, thereby forming a pressure tight seal between the outer periphery of said first tubular member and that portion of the wall in said second tubular member forming the aperture therein.

6. A detachable locked pipe coupling assembly as defined in claim 1, in which
(a) said first tubular member is provided with a second annular groove in its outer peripheral surface disposed between said first mentioned groove and the end near which said first mentioned groove is disposed and
(b) a gasket annulus disposed in said second annular groove and adapted to fit snugly against the opposed complementary surface of the wall forming the aperture in said second tubular member, whereby a pressure tight seal between the outer periphery of said first tubular member and that portion of the wall forming the aperture in said second tubular member is formed.

References Cited in the file of this patent

UNITED STATES PATENTS

| | | |
|---|---|---|
| 221,153 | Chapin | Nov. 4, 1879 |
| 2,013,660 | Lauer | Sept. 10, 1935 |
| 2,772,898 | Seeler | Dec. 4, 1956 |

FOREIGN PATENTS

| | | |
|---|---|---|
| 745,526 | Great Britain | Feb. 29, 1956 |
| 768,974 | Great Britain | Feb. 27, 1957 |